ns Incorporated, a Division
United States Patent [19]
Rose et al.

[11] 3,856,713
[45] Dec. 24, 1974

[54] ELASTOMERIC POLY(ARYLOXYPHOSPHAZENE) COPOLYMERS

[75] Inventors: Selwyn H. Rose, Beachwood;
Kennard A. Reynard, Mentor,
both of Ohio

[75] Assignee: Horizons Incorporated, a Division
of Horizons Research Incorporated,
Cleveland, Ohio

[22] Filed: June 11, 1973

[21] Appl. No.: 368,845

[52] U.S. Cl........... 260/2 P, 260/2.5 R, 260/33.6 R, 260/47 R
[51] Int. Cl....................... C08g 33/16, C08g 33/02
[58] Field of Search............................ 260/2 P, 47 R

[56] References Cited
UNITED STATES PATENTS

| | | | |
|---|---|---|---|
| 3,370,020 | 2/1968 | Allcock et al. | 260/2 P |
| 3,702,833 | 11/1972 | Rose et al. | 260/2 P |

*Primary Examiner*—Wilbert J. Briggs, Sr.
*Attorney, Agent, or Firm*—Lawrence I. Field

[57] ABSTRACT

Aryloxyphosphazene copolymers which are elastomers are described. These materials are thermally and hydrolytically stable and many of the copolymers are useful as fire-retardant materials.

8 Claims, No Drawings

ELASTOMERIC POLY(ARYLOXYPHOSPHAZENE) COPOLYMERS

This invention relates to poly(aryloxyphosphazene) copolymers which are elastomeric and to a process for preparing said polymers. The polymers of this invention are soluble and have high molecular weights and a degree of polymerization from 10–50,000.

Poly(aryloxyphosphazene) homopolymers previously have been described in U.S. Pat. No. 3,370,020, Inorg. Chem., 5, 1709 (1966) and Polymer, 11, 31 (1970). In contrast to the polymers of this invention, these polymers were plastics. Other related art may be found in U.S. Pat. No. 3,515,688 and Polymer, 13, 253 (1972) which describe elastomeric polyphosphazene copolymers but these materials contain fluorinated substituents which make them more expensive than the materials described herein. Also, the solubility of copolymers which contain fluorinated substituents in solvents for the copolymers of this invention is rather limited. Finally, poly(alkoxyphosphazene) elastomers have been described [Inorg. Chem., 5, 1709 (1966)] but these materials are somewhat less stable than the elastomers of this invention.

The poly(aryloxyphosphazene) copolymers of this invention are characterized by repeating

units which contain aryloxy-substituents on the phosphorus atoms in nonregular fashion as shown below.

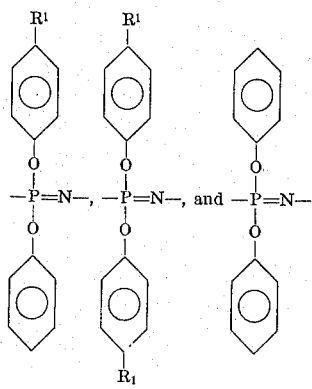

For the sake of simplicity, the formula for copolymers which contain these three units is written as $[(C_6H_5O)_2PN\text{-}(R_1C_6H_4O)_2PN]_n$. The $R_1$ substituent may be a primary, secondary, or $\alpha,\alpha$-dimethyltertiary alkyl radical. When $R_1$ is a monovalent primary alkyl radical, it contains from 2 to 12 carbon atoms. When $R_1$ is a monovalent secondary alkyl radical, it contains from 4 to 12 carbon atoms. When $R_1$ is a monovalent $\alpha,\alpha$-dimethyl- tertiary radical, it contains from 4 to 14 carbon atoms and the copolymers often are obtained as plastics at room temperature but are elastomers (thermoelastomers) above room temperature ($\approx 70°C$). The ratio of $C_6H_5O$ to $R_1C_6H_4O$ can vary from 3:1 to 1:3.

The copolymers of this invention are elastomers which can be compounded and crosslinked to afford vulcanizates which can be used for sealant, damping composition, O-ring, adhesive, foam and other applications. They are often superior to hydrocarbon rubbers, such as natural rubber, cis-1,4-polyisoprene, and cis-1,4-polybutadiene, in that they are more resistant to hydrocarbon solvents, are decidedly more flame-retardant, and are oxidatively more stable. Because the copolymers of this invention can be prepared essentially free of P-Cl sites (i.e., $\leq 0.1\%$ chlorine as P-Cl), these elastomeric copolymers may be safely utilized in moist environments at elevated temperatures.

Some examples of elastomeric and plastic poly(aryloxyphosphazene) copolymers which contain substituents in approximately a 1:1 mole ratio are as follows. The $[(C_6H_5O)_2PN\text{-}(4\text{-}C_2H_5C_6H_4O)_2PN]_n$, $[(C_6H_5O)_2PN\text{-}(4\text{-sec-}C_4H_9C_6H_4O)_2PN]_n$, and $[(C_6H_5O)_2PN\text{-}(4\text{-n-}C_5H_{11}C_6H_4O)_2PN]_n$ copolymers are elastomers whereas $[(C_6H_5O)_2PN\text{-}(3\text{-}CH_3C_6H_4O)_2PN$ and $[(C_6H_5O)_2PN\text{-}(3\text{-}C_2H_5C_6H_4O)_2PN]_n$ are plastics. Also, the $[(C_6H_5O)_2PN\text{-}(4\text{-t-}C_4H_9C_6H_4O)_2PN]_n$ and $[(C_6H_5O)_2PN\text{-}(4\text{-t-}C_5H_{11}C_6H_4O)_2PN]_n$ copolymers are plastics at room temperature, but become elastomers at slightly above room temperature. The position of the $R_1$ group (meta vs para) and the nature of the $R_1$ group (normal vs tertiary) influence the nature of the product. Furthermore, poly(aryloxyphosphazene) homopolymers which contain a long linear side chain, e.g., $[(4\text{-n-}C_5H_{11}C_6H_4O)_2PN]_n$, also are obtained as plastics. These findings further exemplify the uniqueness of this invention which teaches the preparation of poly(aryloxyphosphazene) elastomers.

In the process of this invention, for the preparation of the poly(aryloxyphosphazene) copolymers, poly(dichlorophosphazene) is dissolved in a suitable solvent such as benzene, toluene, xylene, chlorobenzene, 1,2-dichlorobenzene, or mixtures thereof. The resulting polymer solution is gradually added to a well stirred solution or suspension of suitable aryloxide salts. Sodium salts are preferred but both the lithium and potassium salts are also suitable. The salts are preferably present in excess amounts from 105% mole to 150% mole percent based on equivalents of chlorine present in the poly(dichlorophosphazene). For example, alkali salts derived from phenol, 4-ethylphenol, 4-n-propylphenol, 4-butylphenol, 4-sec-butylphenol, 4-isoamylphenol, 4-n-amylphenol, and 4-n-nonylphenol have been found suitable.

The reaction temperature is in the range of 115° to 160°C, and is preferably in the range of 120° to 140°C. The resulting phosphazene copolymers are isolated by known methods familiar to those skilled in the art.

Although the above process is usually preferred because of its simplicity other procedures may be used. For example, the aryloxide salts may be added in combination or sequentially to a solution of $[Cl_2PN]_n$ polymer and the reaction completed as described above.

These methods for the preparation of the copolymers of this invention derived from phenol and p-alkylphenols consistently affords soluble elastomers that are free of P-Cl sites and are of high molecular weight (i.e., had intrinsic viscosities of at least 0.5 dl/g in solvents such as benzene or tetrahydrofuran at 30°C).

The useful properties of the poly(aryloxyphosphazene) copolymer elastomers of this invention can be further improved with compounding and curing by methods well known to those skilled in the art.

Preparation of the poly(aryloxyphosphazene) copolymers of this invention is illustrated by the following examples which are not intended to limit the scope of the invention.

EXAMPLE 1

Preparation of [(C$_6$H$_5$O)$_2$PN-(4-C$_2$H$_5$C$_6$H$_4$O)$_2$PN]$_n$

The [Cl$_2$PN]$_n$ polymer (104.0 g, 1.80 equivs.) was dissolved in 1.9 liters of benzene/xylene (2v/1v) and added in 1 hour to a solution (125°C) of phenoxides which was prepared from phenol (88.8 g, 0.945 mole), 4-ethylphenol (115.3 g, 0.945 mole) and sodium (42.3 g, 1.85 moles) in 1 liter of bis(2-ethoxyethyl)ether. The mixture was heated at 125°C for 40-60 hours. The polymer was precipitated by addition of 1.5 liters of methanol. The precipitated polymer twice was dissolved in 1.5 liters of benzene, washed with water and reprecipitated by addition of methanol. The product (45% yield) was a tan, slightly tacky elastomer (Tg= −27°C) which had slow rebound and intrinsic viscosities in benzene ranged from 0.6–3.0 dl/g at 30°C. The elastomer had a Limiting Oxygen Index of 27. Anal. Calcd. for a 1:1 copolymer of [(C$_6$H$_5$O)$_2$PN-(C$_2$H$_5$C$_6$H$_4$O)$_2$PN]$_n$: C, 64.9; H, 5.4; Cl, 0.0. Found: C, 64.3; H, 5.5; Cl, 0.03. Proton Nuclear Magnetic Resonance (NMR) indicated approximately 1:1 ratio of substituents.

EXAMPLE 2

Preparation of [(C$_6$H$_5$O)$_2$PN-(4-sec-C$_4$H$_9$C$_6$H$_4$O)$_2$PN]$_n$

The [Cl$_2$PN]$_n$ polymer (138.9 g, 2.38 equivs.) was dissolved in 2.0 liters of benzene/xylene (1v/1v) and added over 1.5 hours to a dry solution of sodium aryloxides prepared from 4-sec-butylphenol (214.4 g, 1.44 moles), phenol (135.2 g, 1.44 moles) and sodium (63.3 g, 2.75 moles) in 1.8 liters of bis(2-ethoxyethyl)ether/dioxane (3v/1v). The reaction mixture was heated 31 hours at 125°C. Polymer was precipitated by addition of 3 liters of methanol and was dissolved in 2 liters of methylene chloride, washed exhaustively with distilled water and precipitated with 4 liters of methanol. The product (46% yield) was an off-white elastomer (Tg=−17.5°C) with slow rebound and had an intrinsic viscosity of 2.9 dl/g in benzene at 30°C. The polymer was selfextinguishing when withdrawn from a gas-oxygen flame. Anal. Calcd. for [(C$_6$H$_5$O)$_2$PN-(C$_4$H$_9$C$_6$H$_4$O)$_2$PN]$_n$: C, 66.9; H, 6.3; N, 4.9; Cl, 0.0. Found: C, 65.7; H, 6.4; N, 4.8; Cl, 0.1. Proton NMR indicated a ratio of 46(C$_6$H$_5$O):54(4-sec-C$_4$H$_9$C$_6$H$_4$O).

EXAMPLE 3

Preparation of [(C$_6$H$_5$O)$_2$PN-(4-n-C$_5$H$_{11}$C$_6$H$_4$O)$_2$PN]$_n$

The [Cl$_2$PN]$_n$ polymer (9.8 g, 0.16 equiv.) was dissolved in 100 ml of benzene and added over 1/2 hour to a dry solution (115°C) of sodium aryloxides which was prepared from 4-n-pentylphenol (15.7 g, 0.10 mole), phenol (9.4 g, 0.10 mole) and sodium (4.1 g, 0.18 mole) in 150 ml of bis(2-ethoxyethyl)ether/dioxane (3v/1v). The reaction was heated 27 ½ hours at 125°–129°C. Polymer was isolated and purified as described in Example 2. The product (36% yield) was a moderately strong, very extendable elastomer with an intrinsic viscosity in benzene of 3.3 dl/g at 30°C and a Tg of −35°C. The polymer was self-extinguishing when withdrawn from a gas/oxygen flame. Anal. Calcd. for [(C$_6$H$_5$O)$_2$PN-(C$_5$H$_{11}$C$_6$H$_4$O)$_2$PN]$_n$: C, 67.8; H, 6.6; N, 4.7; Cl, 0.0. Found: C, 67.6; H, 6.8; N, 4.7; Cl, 0.1. Proton NMR indicated the ratio of C$_6$H$_5$O/n-C$_5$H$_{11}$C$_6$H$_4$O to be 51.5/48.5.

EXAMPLE 4

Preparation of [(C$_6$H$_5$O)$_2$PN-(4-t-C$_5$H$_{11}$C$_6$H$_4$O)$_2$PN]$_n$

The [Cl$_2$PN]$_n$ polymer (98.3 g, 1.7 equivs.) was dissolved in 1.5 liters of benzene and added over 1 hour to a solution (110°C) of phenoxides which were prepared from phenol (88.0 g, 0.935 mole), 4-t-amylphenol (153.4 g, 0.935 mole) and sodium (40.0 g, 1.75 moles) in 1 liter of bis(2-ethoxyethyl)ether. The mixture thickened and after 50% of the phenoxides had been added, 500 ml of toluene was added which raised the reflux temperature to 100°C. Benzene (270 ml) was distilled and the reaction refluxed overnight. Titration indicated about 90% conversion. Toluene (500 ml) and bis(2-ethoxyethyl)ether (200 ml) were added and 1.2 liters of benzene were distilled to give a reaction temperature of 123°C. Xylene (500 ml) was added to thin the mixture which was refluxed for 15 hours. The mixture was cooled, and polymer was precipitated by addition of 5 liters of methanol. The polymer was dissolved in 2.5 liters of benzene and reprecipitated with 8 liters of methanol. The precipitated polymer (209.0 g, 81.7% yield) was a tan colored, leathery polymer which had an intrinsic viscosity in benzene of 2.1 dl/g at 30°C and a Tg of +1°C. When this material was heated to approximately 70°C, a tough elastomer was obtained. Anal. Calcd. for a 1:1 copolymer of [(C$_6$H$_5$O)$_2$PN-(C$_5$H$_{11}$C$_6$H$_4$O)$_2$PN]$_n$: C, 67.8; H, 6.6; N, 4.7; Cl, 0.0. Found: C, 67.5; H, 6.8; N, 4.5; Cl, 0.1.

EXAMPLE 5

Preparation of [(C$_6$H$_5$O)$_2$PN-(4-t-C$_4$H$_9$C$_6$H$_4$O)$_2$PN]$_n$

A 2 gallon stainless steel reactor was charged with a solution of sodium aryloxides prepared from phenol (1.08 mole), 4-t-butylphenol (1.08 moles), sodium (2.16 moles) and 1 liter tetrahydrofuran. This solution was taken to reflux at atmospheric pressure and a solution of [cl$_2$PN]$_n$ polymer (1.70 equivs) in 1 liter benzene added over 1 hour. After the addition was completed, the reaction mixture was heated to 160°C and maintained for 22 hours. After cooling, polymer was coagulated with methanol and desalted by wash-milling. The plastic polymer (65% yield) had an intrinsic viscosity of 2.1 dl/g in benzene at 30°C and a Tg of +20°C. When this plastic was heated to about 70°C, it became a tough elastomer. Anal. Calcd. for [(C$_6$H$_5$O)$_2$PN-(C$_4$H$_9$C$_6$H$_4$O)$_2$PN]$_n$: C, 66.8; H, 6.3; Cl, 0.0. Found: C, 66.6; H, 6.4; Cl, 0.03.

EXAMPLES 6–9

The elastomeric poly(aryloxyphosphazene) copolymers of examples 6–9 were prepared following the procedure of example 1 except that the indicated phenols were used in place of phenol and 4-ethylphenol and reaction conditions of 120°–140°C for 30–50 hours were employed. In all instances Proton NMR indicated the ratio of aryloxy substituents to be in agreement with the initial charge of phenols.

| Example | Phenols (moles) | [η][b] | Analysis Found(%)[a] | | |
|---|---|---|---|---|---|
| | | | C | H | Cl |
| 6 | phenol (1.26) | 2.5 | 65.0 | 5.4 | <0.1 |
| | 4-sec-butylphenol (0.63) | | (64.9) | (5.4) | (0.0) |

—Continued

| Example | Phenols (moles) | Analysis Found(%)[a] | | | |
|---|---|---|---|---|---|
| | | $[\eta]$[b] | C | H | Cl |
| 7 | phenol (0.47)<br>4-sec-butylphenol (1.42) | 2.1 | 67.9<br>(68.1) | 6.9<br>(6.8) | <0.1<br>(0.0) |
| 8 | phenol (1.26)<br>4-n-butylphenol (0.63) | 2.5 | 65.8<br>(65.7) | 5.7<br>(5.6) | <0.06<br>(0.0) |
| 9 | phenol (0.80)<br>4-nonylphenol (1.00)[c] | 3.0[d] | 71.0<br>(70.6) | 8.0<br>(7.8) | <0.1<br>(0.0) |

[a] Calculated values in parentheses
[b] Intrinsic viscosity in benzene at 30°C
[c] Product appeared to have a 1:1 mole ratio of substituents by H¹ NMR
[d] Tg = −7.5°C

EXAMPLE 10

Preparation of $[(C_6H_5O)_2PN-(3-C_2H_5C_6H_4O)_2PN]_n$ (Comparative)

The $[Cl_2PN]_n$ polymer (23.2 g, 0.40 equiv.) was dissolved in 250 ml of benzene/xylene (1v/1v) and added over 0.5 hour to a dried solution (125°C) of sodium aryloxides which was prepared from phenol (22.6 g, 0.24 mole), 3-ethylphenol (29.3 g, 0.24 mole) and sodium (10.6 g, 0.46 mole) in 300 ml of bis(2-ethoxyethyl)ether/dioxane (3v/1v). The reaction was heated 40.5 hours at 126°C. Polymer was precipitated by addition of 3 liters of methanol, dissolved in 300 ml of methylene chloride, and after swelling with water, the polymer was reprecipitated with methanol. The finely divided solid was washed exhaustively with methanol/water. The product (19.6 g, 42% yield) was a white, fibrous plastic and had an intrinsic viscosity in benzene of 2.4 dl/g at 30°C and a Tg of −34°C. This material did not become elastomeric even when heated to 130°C. Films cast from benzene were soft and extendable. The copolymer was found to be self-extinguishing when withdrawn from a gas/oxygen flame. Anal. Calcd. for $[(C_6H_5O)_2PN-(C_2H_5C_6H_4O)_2PN]_n$: C, 64.9; H, 5.4; N, 5.4; Cl, 0.0. Found: C, 63.9; H, 5.4; N, 5.4; Cl, <0.1. Proton NMR indicated a $C_6H_5O/C_2H_5C_6H_4O$ ratio of 48/52.

We claim:

1. Poly(aryloxyphosphazene) copolymers having a degree of polymerization between about 10 and about 50,000 consisting of repeating units distributed in a nonregular fashion and represented by the formulas:

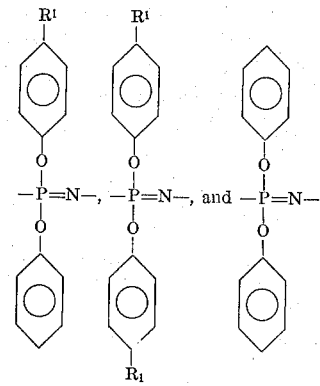

in which $R_1$ represents an alkyl radical selected from the group consisting of primary alkyls with 2 to 12 carbon atoms, secondary alkyls with 4 to 12 carbons and $\alpha,\alpha$-dimethyl tertiary alkyl radicals with from 4 to 14 carbon atoms, and the ratio of $C_6H_5O$ to $R_1C_6H_4O$ is between 3:1 and 1:3.

2. Copolymers of claim 1 in which $R_1$ is $C_2H_5$.
3. Copolymers of claim 1 in which $R_1$ is sec-$C_4H_9$.
4. Copolymers of claim 1 in which $R_1$ is t-$C_4H_9$.
5. Copolymers of claim 1 in which $R_1$ is t-$C_5H_{11}$.
6. Copolymers of claim 1 in which $R_1$ is $C_4H_{19}$.
7. The process for the preparation of the copolymers of claim 1 wherein poly(dichlorophosphazene and alkali metal salts of phenol and of alkylaryl phenol are reacted at 115°–160°C.
8. Shaped articles and films prepared from the copolymers of claim 1.

* * * * *